Jan. 30, 1940.　　　G. V. RYLSKY　　　2,188,821
COMPASS
Filed Dec. 23, 1938
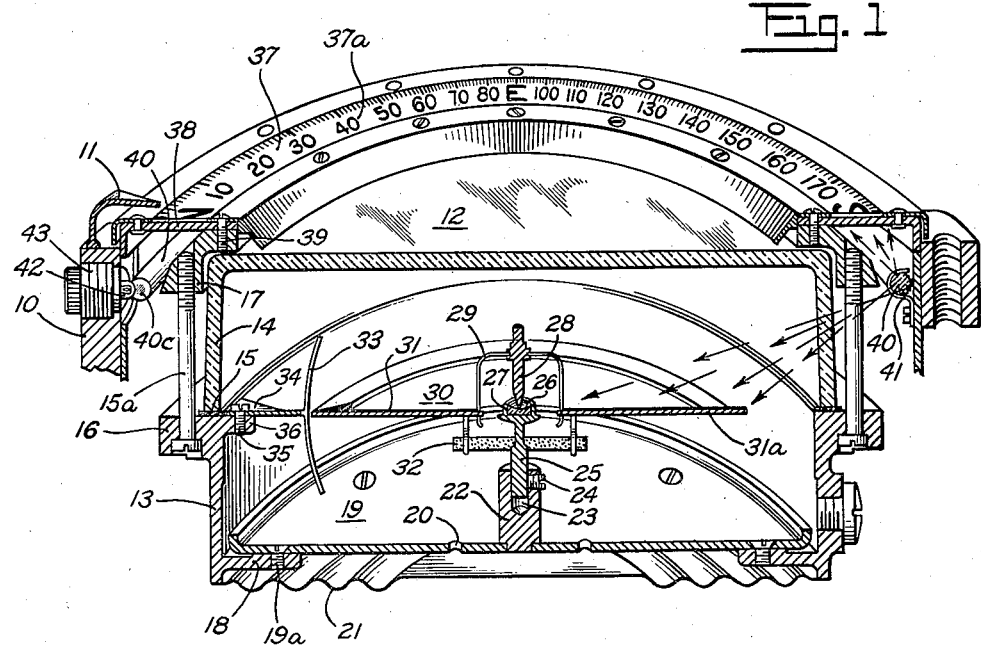
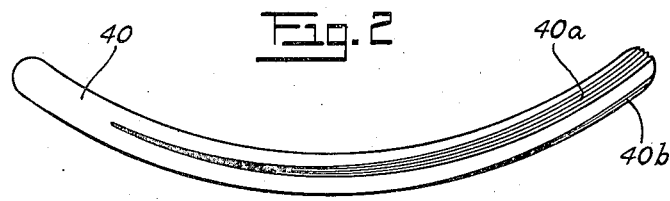
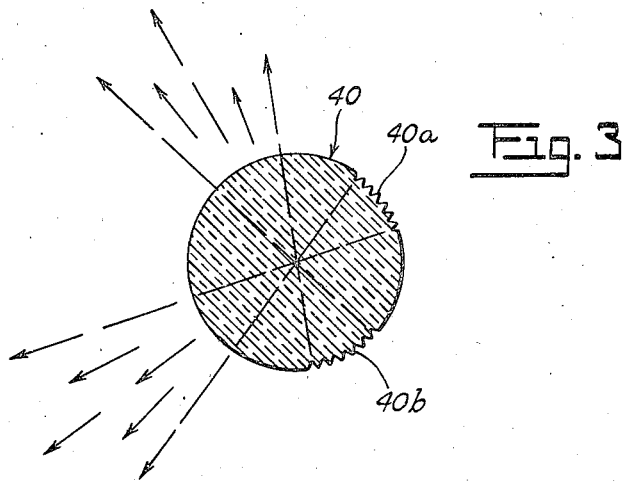
INVENTOR.
Gregory V. Rylsky
BY Stephen Gerstvik
ATTORNEY.

Patented Jan. 30, 1940

2,188,821

UNITED STATES PATENT OFFICE 2,188,821

COMPASS

Gregory V. Rylsky, New York, N. Y., assignor to Bendix Aviation Corporation, South Bend, Ind., a corporation of Delaware Application December 23, 1938, Serial No. 247,500

5 Claims. (Cl. 240—2.1)

The present invention relates to magnetic compasses and more particularly to top reading compasses.

The invention embodies novel means for illuminating the working parts of a magnetic compass, whereby the exact indication of the indicating element may be quickly and accurately read.

More specifically, the device embodying the invention comprises means for uniformly illuminating a transparent scale of a magnetic compass, and means for simultaneously illuminating the index and needle or pointer of such a compass by the same illuminating means, whereby the exact indication thereof is readily visible to the pilot of a craft upon which the compass is mounted, and whereby the illuminating means are greatly simplified.

Similar devices of the prior art have been utilized heretofore, but such devices have used local or spot illumination so that the intensity of the light at various parts of the scale was varied, thereby causing inaccuracy in the reading of the compass indication and greatly decreasing "reading ease" of the compass. Further, such devices of the prior art have failed to produce proper illumination of the index so that the indication of alignment between the compass needle or pointer and the index did not give the "razor-blade" sharpness which is desirable for quick reliable reading of the compass.

It is, therefore, one of the objects of the present invention to provide a novel illuminating means for a compass, whereby the foregoing undesirable characteristics are eliminated.

Another object is to provide a novel compass illuminating system, whereby the compass scale, the needle or pointer and the index are uniformly illuminated.

Still another object is to provide a novel compass illuminating system whereby uniform intensity of illumination is produced throughout the extent of a plurality of planes disposed parallel to each other.

A further object is to provide novel illuminating means for a compass and comprising a point source of illumination, a "ring-light," means for introducing the light from said point source into said "ring-light," and means for projecting and uniformly distributing the light from said "ring-light" against elements of the compass located in a plurality of separated planes.

Another object of the invention is to provide a novel illumination device comprising an elongated light-conducting member formed into a predetermined geometrical shape to provide a light-conducting path continually changing in direction, means for introducing light into said member from the exterior thereof, and means cooperating with said member for reflecting the light out of said member from a side thereof in one desired direction at points extending along substantially the entire length of said member, and from another side thereof in another desired direction at points extending along substantially the entire length of said member.

Still another object is to provide a novel "ring-light" comprising means for uniformly distributing light throughout the ambit of said "ring-light," and means for projecting said light directively out of said ring into a plurality of separated planes.

The above and further objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration and description only, and is not designed as a definition of the limits of the invention, reference being primarily had for this purpose to the appended claims.

In the drawing wherein like reference characters refer to like parts throughout the several views:

Fig. 1 is a view, partly in section, illustrating the relative arrangement of one form of the novel illuminating means and compass parts embodying the present invention;

Fig. 2 is a view, in perspective, of a portion of the novel "ring-light" means; and Fig. 3 is a cross section of the novel "ring-light" means, illustrating diagrammatically the manner of light projection from the ring.

In the drawing, the invention is shown, in the present instance, as applied to a top-reading type of magnetic compass although it is to be expressly understood that the invention is not to be so limited but that the same may be applied to any indicating instrument requiring illumination in a plurality of parallel planes.

Referring to the drawing and more particularly to Fig. 1, 10 is a stationary casing of a compass and carrying the lubber's mark 11.

A compass bowl 12 is rotatably mounted in the casing 10 and comprises a cup-shaped metal base portion 13 upon which is mounted an inverted glass bowl 14 with a gasket 15 located between the base 13 and the bottom rim of the bowl 14. Bowl 14 is maintained in an abutting and sealing relation to the base 13 by means of a plurality of bolts 15a passing through the rim 16 of said base 13 and cooperating with an annular ring member 17 bearing against the top closed portion of the inverted bowl 14 whereby said bowl, gasket 15 and base 13 are held in tightly sealed relationship.

Mounted on a flange 18 by means of screws 19a and extending from the base portion 13 is a plate member 19 containing perforations 20 whereby liquid (not shown) contained in the compass bowl is placed in communication with an expansible chamber formed by the resilient diaphragm 21 attached to the plate 19 at their peripheries, respectively.

Mounted on plate 19 in the center thereof is a post 22. Mounted in a concentric bore 23 in post 22 by means of a set screw 24 is a jewel-carrying post 25 carrying the jewel bearing 26 in a cup-shaped enclosure 27 formed in the post. A pivot member 28 carrying the frame member 29 is mounted in the bearing 26. A magnetic directive system 30 provided with an indicating element 31 in the form of a line marked on a circular card 31a is carried by frame member 29 for rotation about the jewel bearing 26 under the action of magnets 32 (only one of which is shown in Fig. 1) of the directive system. An index 33 is mounted by means of bracket 34 and screw 35 on the flange 36 forming a part of the base 13 said index cooperating with the pointer 31 when the compass bowl 12 is rotated to bring the index and the index-pointer into alignment. A compass scale 37 of translucent material is mounted on an annular member 38 formed of light-conducting material and fastened to ring member 17 by screws 39.

The compass bowl 12 including the ring 17, ring member 38 and translucent scale 37 are mounted for rotation by means (not shown), whereby the compass bowl and scale 37 can be rotated with respect to the compass pointer and with respect to the stationary frame member 10 and the lubber's mark 11 carried thereby.

Index 33 is aligned with respect to the scale 37 so that the stationary lubber's mark 11 in cooperation with said scale will at all times indicate properly the heading of the craft upon which the compass is mounted, when the index 33 and pointer 31 are placed in alignment.

The novel means of the present invention comprise a transparent ring of light-conducting material 40 mounted by means such as a bracket 41 on the interior wall of the stationary casing 10. Ring 40 may be composed of glass, quartz, "Lucite" or any other suitable light-conducting material, whereby the light from a light source, such as a lamp 42 mounted in casing 10 by means of a screw threaded member 43, may be introduced into the ends 40c of the light-conducting member and conducted thereby around the periphery of the compass by means of the split ring 40. Lamp 42 is provided with suitable electrical connections (not shown) whereby it supplies a source of light for introduction into the ends 40c of the "ring-light" member 40. Ring 40 is mounted beneath the light-conducting member 38 carrying the translucent scale 37 which is provided with opaque graduations and numerals 31a, whereby the value of the direction indication can be determined in conjunction with fixed index 11.

As seen from Figs. 2 and 3, the "ring-light" 40 is provided with a plurality of light-reflecting surfaces 40a and 40b extending around the circumference of the ring member, the reflecting area of these reflecting surfaces gradually increasing in amount as the distance from the light source increases, whereby a uniform amount of light is emitted from the ring member at all points on the periphery thereof. These light-reflecting surfaces are provided by scratching, marking, painting, silvering or in any desired manner treating the surface of the light-conducting member whereby a light reflecting surface is formed thereon. As is seen from Figs. 1 and 3, the light is reflected upwardly at an angle from the light-reflecting surface 40b to illuminate the translucent scale ring 37, and light is also reflected downwardly at an angle from the light-reflecting surface 40a whereby the compass card 30, pointer 31 and index 33 are uniformly illuminated. By the novel construction of the "ring-light" member 40 a plurality of spaced parallel planes are provided with uniform illumination throughout the extent of these planes, whereby a sharp "razor-blade" indication between the index and pointer is obtained, and whereby a clear and easily readable indication of the value of the position assumed by the craft may be read from the translucent scale 37 cooperating with fixed lubber's mark 11.

Novel illuminating means for a compass are thus provided, whereby clarity of illumination and ease of reading are furnished at any relative position of the compass indicating elements, and whereby illumination may be obtained simultaneously in a plurality of spaced parallel planes by the same illuminating means.

Although only one embodiment of the invention has been illustrated and described, various changes and modifications in form, materials and relative arrangement of parts, which will not appear to those skilled in the art, may be made without departing from the scope of the invention. Reference is, therefore, to be had to the appended claims for a definition of the limits of the invention.

What is claimed is:

1. In a magnetic compass, a magnet system including an indicating element actuated by the earth's magnetic field, means cooperating with said indicating element to present a visual indication of alignment between said element and means, means connected to said first means including a translucent scale, means carrying a lubber's mark cooperating with said scale, means mounting said lubber's mark carrying means and said scale for relative rotation therebetween, and means including a light source and a light-conducting member disposed in light-conducting relation with respect to said scale and magnetic field responsive means, said light-conducting member being provided with means for projecting light therefrom in a plurality of desired non-intersecting directions so as to simultaneously illuminate said magnet system and said translucent scale.

2. A top-reading magnetic compass comprising a magnetic directive system including a pointer element carried thereby, an index cooperating with said pointer element, a translucent scale movable with said index, a lubber's mark cooperating with said translucent scale, a light-conducting member extending circumferentially about the compass and located beneath said translucent scale, a light source in cooperative relation with said light-conducting member, means cooperating with said light-conducting member whereby light is projected through said scale, and means cooperating with said light-conducting member whereby light is projected upon said pointer element, and index.

3. A magnetic compass comprising a bowl, means responsive to the earth's magnetic field rotatably mounted in said bowl, means for visually indicating the position of said responsive means, a translucent scale, an index movable with said scale, means for relatively orienting said scale and indicating means whereby said index and indicating means are aligned, a light source, a light-conducting ring member located beneath said translucent scale and above said index and said direction indicating means, and means cooperating with said light-conducting means for projecting light outwardly therefrom throughout its extent upwardly against said translucent scale and downwardly upon said index and indicating means.

4. In combination, a light-conducting and light-emitting member comprising an elongated member formed to enclose a space having a desired geometrical shape, means for introducing light rays into said elongated member, a translucent scale member located in cooperative relation with said elongated member, means cooperating with said elongated member for projecting light outwardly from said member substantially throughout its length upon said translucent scale, a direction indicating member, means for relatively aligning said direction indicating member and said scale, and means cooperating with said light-emitting member for projecting light outwardly therefrom substantially throughout its length upon said direction indicating means and said aligning means.

5. In combination, a direction indicating means located in one plane, a translucent scale located in a plane spaced from the plane of said direction indicating means, a light-conducting and light-emitting member shaped to conform to the outlines of said translucent scale and located in a plane intermediate said first two planes, means for introducing light rays into said light-conducting member from the exterior thereof, and means cooperating with said light-conducting member whereby light is emitted therefrom simultaneously upon said scale and indicating means substantially throughout the length of said light-conducting member.

GREGORY V. RYLSKY.